No. 622,078. Patented Mar. 28, 1899.
H. F. ROACH.
MEANS FOR GENERATING ELECTRICITY FROM MACHINERY OF LOCOMOTIVES.
(Application filed Jan. 23, 1899.)
(No Model.)
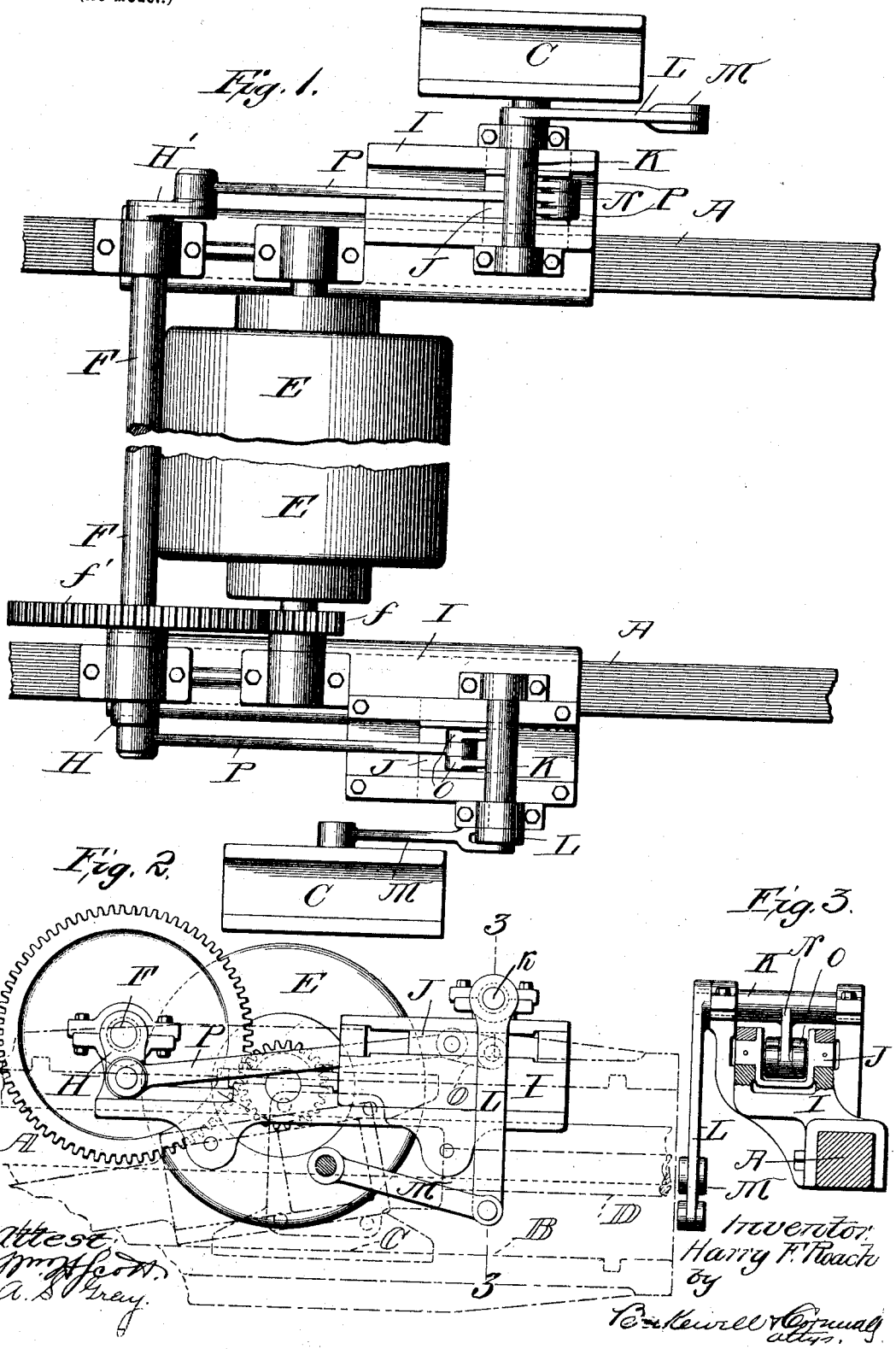
Inventor
Harry F. Roach

United States Patent Office.

HARRY F. ROACH, OF ST. LOUIS, MISSOURI.

MEANS FOR GENERATING ELECTRICITY FROM MACHINERY OF LOCOMOTIVES.

SPECIFICATION forming part of Letters Patent No. 622,078, dated March 28, 1899.

Application filed January 23, 1899. Serial No. 703,170. (No model.)

*To all whom it may concern:*

Be it known that I, HARRY F. ROACH, a citizen of the United States, residing at the city of St. Louis, State of Missouri, have invented a certain new and useful Improvement in Means for Generating Electricity from the Machinery of Locomotives, of which the following is a full, clear, and exact description, such as will enable others skilled in the art to which it appertains to make and use the same, reference being had to the accompanying drawings, forming part of this specification, in which—

Figure 1 is a plan view of my improved means for generating electricity from the machinery of locomotives, showing the dynamo and its associate parts mounted on the frame of the locomotive. Fig. 2 is a side elevational view of the same; and Fig. 3 is a sectional view on line 3 3, Fig. 2.

This invention relates to a new and useful improvement in means for generating electricity from the machinery of locomotives, and has for its object to provide a simple, reliable, and effective construction of said means whereby a current of electricity will be generated by a dynamo, the same to be used for lighting, heating, or operating motors, or for any other purpose desired, upon a locomotive or any of its drawn coaches or cars. United States Letters Patent No. 617,187 were granted to me January 3, 1899, for a device of similar character wherein the dynamo was rotated by a pitman attached to the cross-head of a locomotive proper, said pitman rocking a lever of the first order, to the other end of which was attached a link connected to a second or interposed cross-head, on which was mounted a second link directly connected to a crank-arm on the armature-shaft of the dynamo.

My present invention consists in an improvement in the above mechanism and may be said to consist of the pitman connected to the cross-head of the locomotive proper, the other end of said pitman being attached to the lower end of a lever of the second order, which carries a link operating between guides and connected to a cross-head, in turn connected by a link to a crank-shaft geared to the armature-shaft. This lever of the second order I prefer to mount in advance of the dynamo and immediately behind the cylinder of the locomotive for the purpose of protection from stones and gravel instead of arranging said lever some distance back from the cylinder and behind the dynamo, as is illustrated in my patent before referred to.

In the drawings, A indicates a portion of the main frame of a locomotive, B the cross-head guides secured thereto, (which are shown in dotted lines,) C the cross-head, and D the piston-rod, (shown in dotted lines,) all of which parts are of well-known construction.

E indicates a dynamo mounted upon the main frame A. G indicates the armature-shaft of said dynamo, mounted in suitable bearings $g$, secured to the main frame A. On this armature-shaft I prefer to mount a pinion $f$, which meshes with a geared wheel $f'$, arranged on the counter-shaft F, mounted in suitable bearings on the main frame, on the ends of which counter-shaft are arranged crank-arms H and H', preferably at an angle of about ninety degrees apart, corresponding to the relation of the wrist-pins of the driving-wheels of the locomotive to each other.

I indicates a bracket or support preferably secured to or mounted upon the main frame A, which bracket is formed with guideways in its upper face, in which guides is mounted a cross-head J. Arranged in suitable bearings above these guides is a rock-shaft K, on the outer end of which is secured a lever or rock-arm L, to whose lower end is connected a link M, in turn connected with the cross-head of the locomotive proper. Depending from the rock-shaft K is a short rock-arm N, to which is connected a short link O, connecting said rock-arm to the cross-head J. On the pivot-pin, arranged in the cross-head on which the links O are mounted, there being preferably two of such links, is arranged a link or pitman P, whose other end is connected to the crank H on the counter-shaft F. The crank H' on the other end of counter-shaft F, and which is preferably arranged at ninety degrees to the crank H, has also connected to it a link P, the parts being duplicated on each side of the locomotive.

I have not deemed it necessary to show the fluid-thrown valve and the switch controlled thereby for directing the current in one direction regardless of the direction in which the dynamo rotates, as illustrated in my former patent; but I will state that I contemplate using such device in connection with the mechanism shown in the accompanying drawings.

Having thus described my invention, what I claim, and desire to secure by Letters Patent, is—

1. The combination with a reciprocating cross-head of a locomotive, of a link connected thereto, a rock-arm to which said link is connected, a bracket mounted on the main frame of a locomotive, in which said rock-arm is mounted, a sliding cross-head mounted in said bracket, a link connection between said rock-arm and said cross-head, a crank-shaft which is connected to said cross-head by a link, and an armature-shaft which is rotated by said crank-shaft; substantially as described.

2. The herein-described mechanism for rotating the armature of a dynamo mounted on the main framing of a locomotive, the same comprising the following elements in combination; a dynamo, a crank-shaft for driving the armature of said dynamo; a link connected to said crank-shaft; a bracket mounted on the main framing of the locomotive and formed with guideways; a cross-head mounted in said guideways, to which said link is connected; a rock-shaft mounted in said bracket and provided with a rock-arm; links connecting said rock-arm and said cross-head; a main rock-arm mounted on the end of said rock-shaft, the cross-head proper of the locomotive, and a link connection between said cross-head and said rock-arm; substantially as described.

3. The combination with the main framing A of a locomotive and its cross-heads C, of a dynamo supported by said main framing, the counter-shaft mounted on said main framing and geared to the armature-shaft on said dynamo for driving the same, said counter-shaft having cranks on its ends arranged at an angle to each other, brackets I mounted on said main framing, cross-heads J mounted in said brackets, a rock-shaft K also mounted in said brackets above said cross-heads, rock-arms L on the ends of said rock-shafts, links M connecting the ends of said rock-arms with the cross-heads C, rock-arms N depending from the shafts K, links O connecting the rock-arms N to the cross-heads J, and links P connecting said cross-heads to the cranks on the ends of the counter-shaft; substantially as described.

In testimony whereof I hereunto affix my signature, in the presence of two witnesses, this 21st day of January, 1899.

HARRY F. ROACH.

Witnesses:
F. R. CORNWALL,
A. S. GRAY.